Feb. 16, 1937. E. HUFFMAN 2,071,166
PIPE CUTTER
Filed Sept. 27, 1934 2 Sheets-Sheet 1
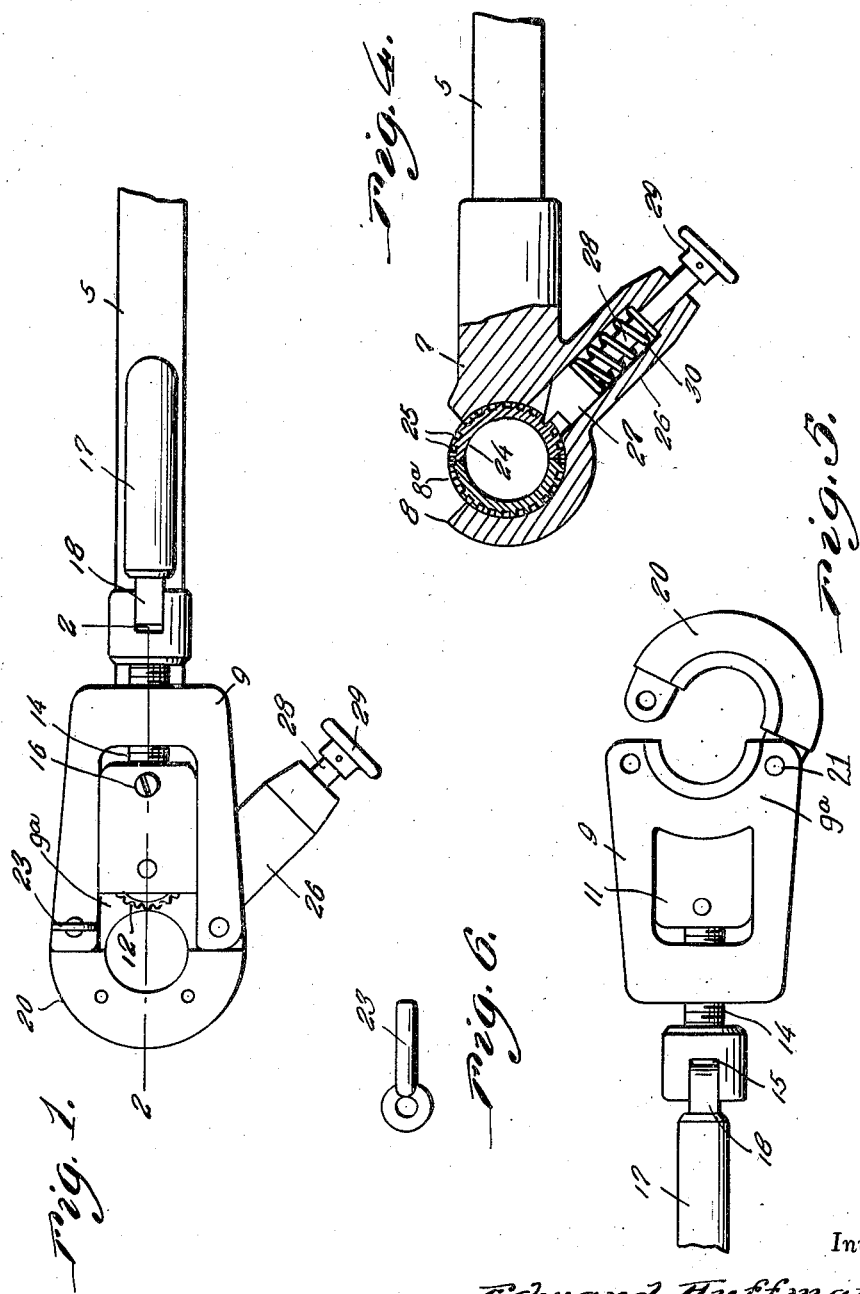
Inventor
Edward Huffman
By Clarence A. O'Brien
Attorney Feb. 16, 1937.  E. HUFFMAN  2,071,166
PIPE CUTTER
Filed Sept. 27, 1934   2 Sheets-Sheet 2
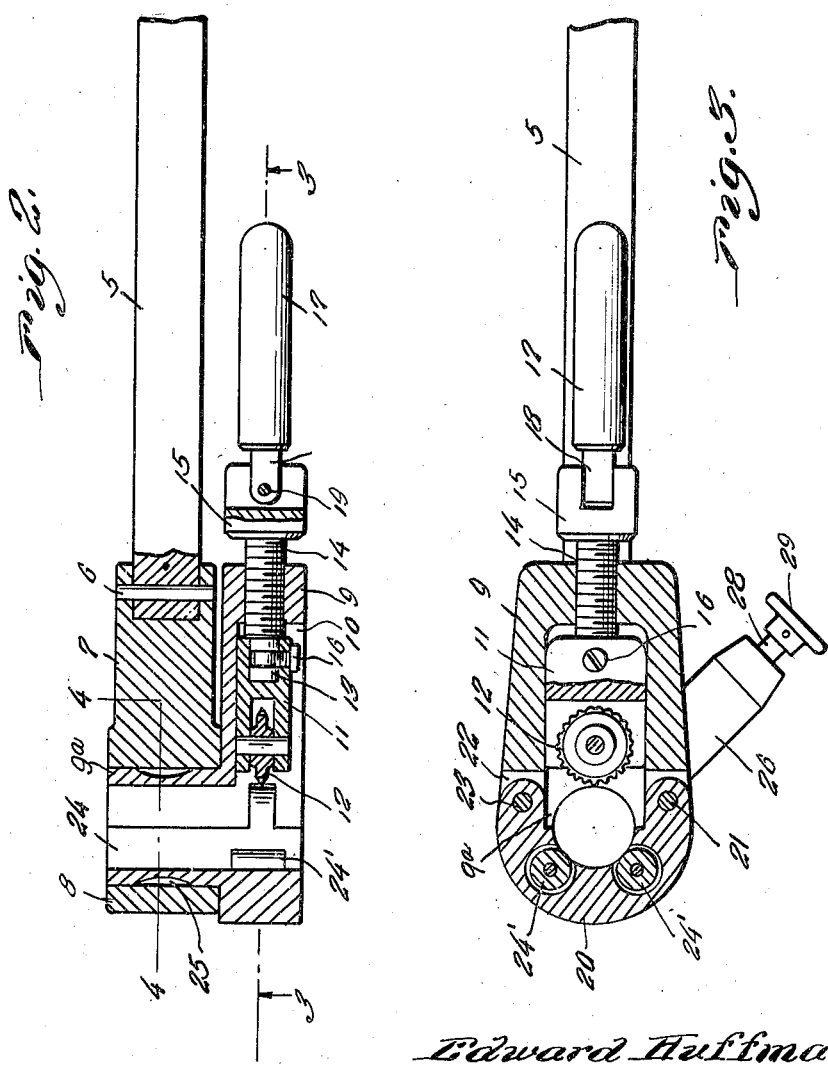
Inventor
Edward Huffman
By Clarence A. O'Brien
Attorney Patented Feb. 16, 1937

2,071,166

UNITED STATES PATENT OFFICE 2,071,166

PIPE CUTTER

Edward Huffman, Mount Summit, Ind.

Application September 27, 1934, Serial No. 745,785

3 Claims. (Cl. 81—191)

This invention appertains to new and useful improvements in the general art of tools and more particularly to a pipe cutting implement.

A problem of long standing in the vocation of plumbing, and in occupations analogous thereto involving the fitting and repairing, installing and re-installing and revamping of gas pipe lines, steam pipe lines and the like, has been that of severing of such pipes in situations where working space about the pipe is restricted, and where the pipe and its connections are difficult of access. Through lack of means to readily sever the pipe under such circumstances, the worker is compelled either to cut the pipe in two with saws, chisels or other tools, or possibly, to disconnect and remove such portions of the pipe line that the desired section thereof may be made available to the applying to use of a pipe cutter implement of usual structure and function.

The general object of my invention is to provide a pipe cutting implement which is capable of being easily applied to working position and of being effectively manipulated in close quarters and regardless of whether an end of the pipe may be available; and by the operation of which said implement the severance of the pipe is clean, true, and free from burs.

The foregoing object, as well as other and more specific aims which will presently be apparent, are accomplished by, and the invention is embodied in the new construction, combination, and arrangement of parts described in the following specification, and illustrated in the accompanying drawings.

In the drawings—

Figure 1 is a side view of my improved pipe cutting implement, a portion of the turn bar being broken away.

Figure 2 is a cross section view taken on the broken line 2—2 in the direction of arrow 2 in Figure 1.

Figure 3 is a cross section view taken on the broken line 3—3 in the direction of arrow 3 in Figure 2.

Figure 4 is a detached view of the turn bar, the handle portion thereof being broken away, and the head portion thereof being shown in cross section.

Figure 5 is a detached view of the body structure, the movable half section of the sleeve which constitutes a part of said body structure, being shown in open position.

Figure 6 is a detached view of the fastener pin by which the movable half section of the sleeve is made fast when it is in the position closed, and as it appears in Figure 1.

The frame of my improved pipe cutter and which consists of a metal block 9, is provided with a central longitudinal guideway, as shown in Figures 1 and 3. Integral with the forward end of said frame is a half section 9a and with which a half section 20 is articulated, as by a hinge pin 21, thereby constituting a split sleeve. The half section 20 is movable to position open and apart from, and it is movable to position closed and adjoined with, the fixed half section 9a. Means operable to manually fasten the half section 20 in, and to unlock it from, the closed position, as shown in Figure 1 and in Figure 3, consists of a fastener pin 23. The function of peripheral notches 25 will presently be referred to.

Slidingly retained in the guideway of the frame block 9 is a cross head 11 and in which is journaled a steel cutter wheel 12. Journaled in the sleeve half section 20 at positions spaced equidistant from the longitudinal center line of the said cross head 11 are hard steel rollers 24' and 24'. These rollers constitute abutments with which a pipe (not shown) is in metal to metal engagement when the sleeve half sections are in the locked status and cutting pressure is applied to the cutter wheel.

A device carried by the said frame 9 and which is operable to move the cross head to, and is operable to retain it in various adjusted positions, consists of a stem 14 threaded through the rear portion of the said frame and whose inner and grooved end is journaled in a bore therefor in the said cross head, and is there retained against axial displacement by a stud 16. The outer end of the said stem 14 is provided with a head 15 and to which a handle 17 is pivotally attached as by a pin 19. By this arrangement, the handle may be operated at different angles of inclination, it therefore being easily manipulated when the implement is being worked in close or difficult quarters. Also, the said handle being movable to a position at a right angle to said frame, the space necessary within which to move the frame 9 rotatively on the pipe, is minimized.

5 designates a turn bar. This turn bar has enlarged body portion 7 which embodies a head member provided with a bore of a diameter in which the said split sleeve may readily be received. In this said head member is a gap 8a of a dimension greater than the inside diameter of the split sleeve aforesaid, so that the turn bar head may easily clear the pipe when the said head is being passed to its operative position journaled on the split sleeve, and in which it appears as in Figure 2 of the drawing. Retained in an integral boss of the said turn bar head, is a pawl 27 whose tooth is engaged with one of the notches 25 of the said split sleeve, under the urge of helical spring 30. The pawl thus engaging the notch serves to retain the turn bar against dislodgement from its operative position, and it also functions so that by a swing of the turn bar, there is an actuation of the body assembly rotatively.

The invention lends itself to effective use in places where an end of the pipe line is not available, such as in trenches, and as in installations where space is limited within which to apply tools to the pipe, and where perhaps a union joint enabling uncoupling of the pipe line is not available.

To practice my invention, the cutter assembly is so disposed that the sleeve half section 20 is in engagement with the pipe which is to be severed. Then with a moving of the body 9, or of the said sleeve half section 20 so that the latter is in position closed and adjoining the sleeve half section 9a, the pipe will have been engaged. The fastener pin 23 is now inserted, the said half sections being thereby secured. When the assembly just described will have been placed in the desired particular location on the said pipe, the operative swings the turn bar in the direction indicated by the tooth of the pawl 27. The extent of the actuation of the cutter assembly, with each stroke of the turn bar, will depend upon the amount of space available within which to swing the turn bar. Obviously, with each alternate swinging of the turn bar, the split sleeve and the body structure integral therewith, is moved a part of the distance around the pipe. The point of contact of the cutter wheel being equidistant from the hard steel rollers 24' and 24', and the latter acting as abutments with which the pipe is in metal to metal engagement or contact, and the frame block 9 being stayed by the split sleeve in a true right angle position relative to the axis of the pipe, the course of the cutter wheel is true, and at the same time, tendency toward the formation of a burr at the severed edge of the pipe is overcome.

The invention besides affording facility for the placing of the sleeve and the associated cutter elements in working position on the pipe in a place where space is restricted, it also affords facility whereby the cutter assembly may be actuated to perform the cutting operation. The turn bar is easily passed over the pipe, the gap 8a freely clearing the pipe, and the bore of the turn bar head member being readily placed in its position journaled on the split sleeve. Whereas the turn bar is retained by the pawl against dislodgement, it is free to be swung rotatively, and, within a limited extent of stroke, to move the cutter assembly through complete revolutions. At the same time there is facility whereby the operator may drive the cutter wheel and maintain it at cutting contact.

Whereas the embodiment of my invention as it is described and illustrated herein is typical, and it is practicable for accomplishing the objects for which it is intended, I wish it to be understood that modifications may be made in the several features and details of form and construction, without departing from the spirit or principle of the invention or sacrificing any of its advantages.

Having described the invention, what is claimed as new is:

1. An implement of the kind described, comprising a frame, a cutter element retained in and which is movable longitudinally of the frame, a split sleeve having peripheral notches, and which is composed of articulated half sections detachably fastened in closed position, one of them being integral with the frame, means carried by the frame and operable to move the cutter element to and to retain it in varied position with relation to the said sleeve, a turn bar having a head member with a bore the said head member being removably journaled on the said sleeve when the half sections thereof are in closed relation, there being a gap in said turn bar head member wider than the diameter of the bore of said sleeve, and a pawl carried by the said turn bar to engage the peripheral notches in the said sleeve.

2. A pipe cutting implement, comprising a frame provided with a central longitudinal guideway, a split sleeve having spaced peripheral notches, the said sleeve being composed of articulated half sections one being integral with the said frame and having its interior communicating with the said guideway, and the other being movable to open position apart from, and being movable to closed position adjoined with the said integral half section, means operable to fasten the movable half section in and to unfasten it from the closed position, a cross head loose in said guideway, a cutter wheel journaled in the cross head, means on the body frame operable to move the cross head to and to retain it in varied adjusted positions with relation to the said sleeve, and a turn bar embodying a head band with an annular bore of a diameter to be journaled on said sleeve, and there being a gap in said head band wider than the diameter of the bore of the said sleeve.

3. An implement of the kind described, comprising a frame provided with a longitudinal guideway, a sleeve having spaced peripheral notches, the said sleeve being of divided formation and composed of articulated half sections one being integrated with the end of said frame and having its interior to communicate with said guideway, and the other being movable to position open and apart from, and being movable to position closed and adjoined with the said integrated half section, means operable to fasten the movable half section in and to unfasten it from the closed position, a cross head in said guideway, a cutter wheel carried by the cross head, spaced hard steel rollers in the said movable half section, means on the body frame to move the cross head and to retain it in projected position and in retracted position, a turn bar embodying an arcuate head band removably journaled on the sleeve, there being a gap in said head band wider than the diameter of the bore of the said sleeve, and a spring pressed pawl carried by the said turn bar and to be engaged with the said peripheral notches of said sleeve.

EDWARD HUFFMAN.